Figure 1:
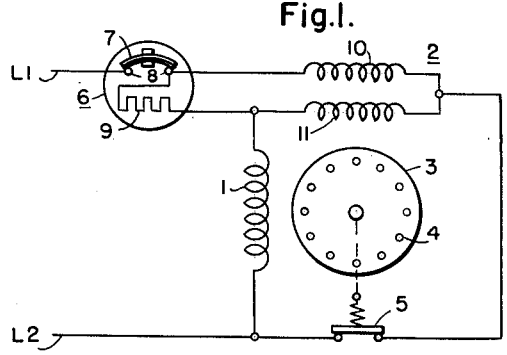

Feb. 24, 1953 T. CHARLTON 2,629,848
THERMAL PROTECTION FOR SINGLE-PHASE MOTORS
Filed May 26, 1951

WITNESSES:
E. A. McCloskey.
Nw. L. Groome

INVENTOR
Thomas Charlton,
BY
ATTORNEY

Patented Feb. 24, 1953

2,629,848

UNITED STATES PATENT OFFICE 2,629,848

THERMAL PROTECTION FOR SINGLE-PHASE MOTORS

Thomas Charlton, Lima, Ohio, assignor to Westinghouse Electric Corporation, East Pittsburgh, Pa., a corporation of Pennsylvania Application May 26, 1951, Serial No. 228,447

9 Claims. (Cl. 318—220)

The present invention relates to thermal protection of single-phase motors, and more particularly to means for providing adequate thermal protection for both the main and auxiliary windings of such motors.

Single-phase induction motors have a main, or running, primary winding and an auxiliary, or starting, primary winding, which are physically displaced from each other on the stator of the motor. These windings are connected in parallel to a single-phase line and carry currents which differ in phase, in order to develop a starting torque, the auxiliary winding usually being disconnected from the line when the motor has come up to speed. Such motors are frequently protected against over-heating due to an overload, or other cause, by means of a thermostatic device comprising a bimetallic element, usually a disc, and a heater for heating the disc. The bimetallic element carries a contact or contacts cooperating with a stationary contact or contacts to interrupt the motor circuit. In the conventional arrangement, the bimetallic element and contacts and the heater are connected in series with the line, so as to carry the line current, and the bimetallic element operates to open the contacts in response to a current or temperature which will cause dangerous over-heating of the motor.

Protection is usually desired for two main conditions, running overload and overload under starting or locked rotor conditions. If an overload occurs while the motor is running, or if an excessive current occurs for any other reason, the thermostat should operate to limit the temperature of the main winding to about 110° C. to 120° C., and should open its contact to disconnect the motor from the line in response to a current of a magnitude and duration which will cause the winding to exceed this temperature. Under starting conditions, it is also necessary to protect the auxiliary winding from over-heating, since this is usually a high-resistance winding which is not designed to carry current continuously and which can easily be burned out. Since this winding is disconnected after the motor has started, however, it can be allowed to reach a somewhat higher temperature than the main winding, and in order to take full advantage of the maximum overload capacity of the motor, the auxiliary winding can be allowed to reach a temperature of 150° C., thus making sure that the motor will start under all normal conditions and under reasonable over-loads.

It is usually relatively easy to obtain the desired protection for one or the other of these conditions, but it is extremely difficult to obtain both types of protection at the same time. Thus, in many cases, a thermostat having a low ultimate trip rating is required to obtain proper protection against running over-loads, and the inherent characteristics of such a thermostat cause it to have a relatively short locked rotor time, so that the motor will be disconnected during starting before the auxiliary winding has reached the maximum permissible temperature, and thus the motor may be needlessly disconnected before it has come up to speed when driving a load which has considerable inertia, such as a fan or a blower. Similar difficulties are encountered with other types of motors and thermostats, and in general, it is usually difficult, if not impossible, to obtain the desired protection against both running and starting overloads.

The principal object of the present invention is to provide a single-phase induction motor in which adequate thermal protection is provided for both the main and auxiliary windings under both running and starting conditions.

Another object of the invention is to provide thermostatic protective means for single-phase induction motors which provides adequate protection under both running and starting conditions, and which is applicable to both single voltage and dual voltage motors.

A further object of the invention is to provide a single-phase motor in which thermal protection is provided by means of a thermostatic device which may be of the usual type but which is connected so that the bimetallic element carries the line current and the heater carries the current of the main winding and a predetermined part, preferably half, of the current of the auxiliary winding.

A more specific object of the invention is to provide a single-phase motor in which the auxiliary winding is wound in two similar sections which are connected in parallel, so that each section carries substantially half of the total auxiliary winding current, and in which thermal protection is provided by a thermostatic device having a bimetallic element connected to carry the line current and a heater connected to carry the current of the main winding and of one section of the auxiliary winding, thus providing adequate protection under both starting and running conditions.

Figure 2:
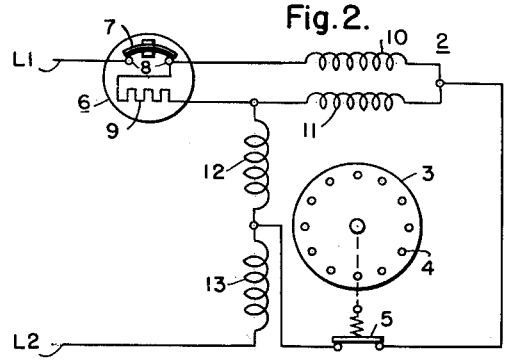
Figure 3:
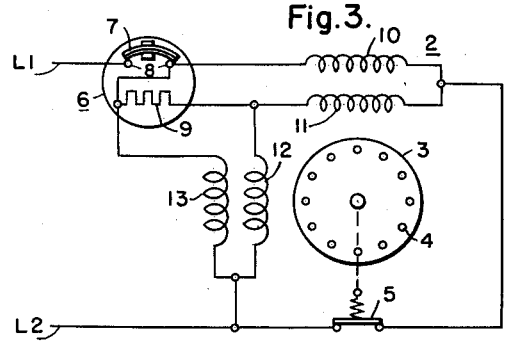

The invention will be more fully understood from the following detailed description, taken in connection with the accompanying drawing, in which:

Figure 1 is a schematic diagram of a single-phase motor embodying the invention, and Figs. 2 and 3 are similar diagrams showing the application of the invention to a dual voltage motor, Fig. 2 showing the high-voltage connection and Fig. 3 the low-voltage connection.

The invention is shown in Fig. 1 embodied in a single-phase motor having a main primary winding 1 and an auxiliary primary winding 2, which are adapted to be connected in parallel to a single-phase line L1, L2. The motor has a rotor member 3 carrying a squirrel-cage secondary winding 4, and the auxiliary winding 2 is connected in parallel with the main winding 1 through a switch 5, which is shown as a speed-responsive switch actuated by the rotor 3, and adapted to open when the rotor reaches a predetermined speed. The motor is shown as a split-phase motor, in which the phase difference between the currents in the windings is obtained by the design of the windings themselves, but it will be understood that the invention is equally applicable to other types of single-phase motors, such as the capacitor-start motor, in which the phase difference is obtained by means of a capacitor connected in series with the auxiliary winding.

The motor is protected against over-heating by means of a thermostat 6, which may be of any suitable or usual construction. As shown, the thermostat 6 includes a bimetallic element 7, preferably a disc, which carries contacts normally bridging stationary contacts 8. The bimetallic element 7 is adapted to snap to its opposite position and open the contacts when it is heated above a predetermined temperature. The bimetallic element 7 is heated by current passing through it, and is also heated by a heater coil 9 of any suitable type associated with the bimetallic element.

As previously indicated, the conventional arrangement for such a thermostat is to connect both the bimetallic element 7 and the heater 9 in series in the line, so as to be responsive to line current, so that the thermostat opens its contacts in response to an over-current of a magnitude and duration which will cause the winding temperature to rise above the permissible limit. As pointed out above, however, with this conventional arrangement, it is usually not possible to obtain proper protection for both the main and auxiliary windings under both running and starting conditions, and if the main winding is properly protected against running overloads, the motor may be disconnected unnecessarily under heavy starting loads, while, if the thermostat is designed and adjusted to allow the auxiliary winding to reach the maximum permissible temperature under starting conditions, the main winding may not be adequately protected against running overloads.

It would, of course, be possible to connect the bimetallic element to carry the line current and to connect the heater to carry only the main winding current, and proper protection against running overloads could be readily obtained. Under starting conditions, however, the heating effect of the heater would not be sufficient if it carried only the main winding current, and the auxiliary winding would be allowed to reach dangerously high temperatures under heavy starting loads or stalled conditions, and thus the auxiliary winding would not be properly protected. If the heater were connected to carry only the auxiliary winding current, proper protection of the auxiliary winding under starting conditions could readily be obtained, but the main winding would not be protected against running overloads since the auxiliary winding is disconnected during running, and the heater would be carrying no current.

In accordance with the present invention, it is proposed to provide adequate protection for both main and auxiliary windings under all conditions by connecting the thermostat so that the bimetallic element 7 carries the line current and the heater 9 carries the main winding current and a predetermined portion of the auxiliary winding current. The part of the auxiliary winding current which flows through the heater is preferably one-half of the total auxiliary winding current, since this has been found to give satisfactory results, and can be obtained most readily and inexpensively. It is to be understood, however, that the invention is not limited to this specific proportion of the auxiliary winding current.

While the desired part of the auxiliary winding current for energizing the heater 9 can be obtained in any desired manner, it is preferred to obtain this current by winding the auxiliary winding 2 in two similar sections 10 and 11, which are made identical and which may readily be wound by using two equal conductors in parallel, wound together in the slots of the stator. The size of the conductors used for the winding sections 10 and 11 should be such that the cross-sectional area of each conductor is equal to half the cross-sectional area of the single conductor which would be used in a conventional motor, and since the two winding sections 10 and 11 are connected in parallel, it will be apparent that the motor is electrically equivalent to a conventional motor. As shown in Fig. 1, the bimetallic element 7 of the thermostat 6 is connected in series with the line to carry the full line current, the contacts also being in series in the line so that the motor is disconnected when the bimetallic element is heated above its operating temperature. The heater 9 is connected in series with the main winding 1 and with one section 11 of the auxiliary winding 2, so that it carries the main winding current and substantially one-half of the total auxiliary winding current.

With this arrangement adequate protection is provided for both windings under all conditions. Thus, when the motor is running, with the auxiliary winding 2 disconnected by the speed-responsive switch 5, the current in the heater 9 is only the main winding current, which is equal to the line current, and the conditions are then the same as in the conventional arrangement, and adequate protection of the main winding 1 against running over-loads is readily obtained. Under starting conditions, the heater 9 carries the main winding current and half of the auxiliary winding current, and thus carries a resultant current which is less than the line current. The heating effect of the heater 9 during starting is therefore materially less than it would be in the conventional connection, and the temperature of the auxiliary winding will be permitted to rise to a materially higher maximum than would be possible with the conventional thermostat connection, so that full advantage can be taken of the maximum overload capacity of the motor in starting a high inertia load, or in attempting to start under stalled conditions. It will be apparent, therefore, that adequate protection can be obtained for both windings under all conditions, and that the maximum starting effort can be obtained from the motor without jeopardizing the auxiliary winding, and without affecting the desired protection of the main winding under running conditions.

The invention is readily applicable to dual voltage motors, as well as to the single voltage motor shown in Fig. 1. Figs. 2 and 3 show the connections for a typical dual voltage motor, in which the main winding is divided into two similar sections 12 and 13, the other elements of the motor being the same as in Fig. 1. In the high-voltage connection shown in Fig. 2, the two sections of the main winding are connected in series, and the auxiliary winding 2 is connected across one section 12 of the main winding so that the voltage across the auxiliary winding is one-half the line voltage. The thermostat 6 is connected as before with the bimetallic element 7 in series in the line, and with the heater 9 carrying the current of the main winding and of one section of the auxiliary winding, so that it is energized by the main winding current and one-half the auxiliary winding current.

In the low-voltage connection, shown in Fig. 3, the two sections 12 and 13 of the main winding are connected in parallel to the line, and the auxiliary winding 2 is connected in parallel with the main winding, so that the voltage across the auxiliary winding, and therefore its current, are the same as before. The thermostat is again connected with its bimetallic element 7 in series in the line and with the heater 9 carrying the current of one section of the auxiliary winding. Since the two sections 12 and 13 of the main winding are now in parallel, the current in each section will be substantially the same as it was in the high-voltage connection, with the two sections in series across twice the voltage. The heater 9 of the thermostat is, therefore, connected to carry the current of one section 12 of the main winding, so that the currents in the heater will be the same in the low-voltage connection as in the high-voltage connection. It will be seen that both windings are adequately protected against over-load under either starting or running conditions in both high-voltage and low-voltage connections, in the same manner as described above in connection with Fig. 1, so that the invention is readily applicable to dual voltage motors in the same manner as to single voltage motors.

It should now be apparent that a single-phase motor has been provided in which proper thermal protection is obtained for the main and auxiliary windings under both starting and running conditions and in a relatively simple and inexpensive way. Certain specific embodiments of the invention have been shown and described for the purpose of illustration, but it will be apparent that the invention can be applied in other ways and to other types of motors, and it is to be understood, therefore, that the invention is not limited to the specific arrangements shown, but in its broadest aspects, it includes all equivalent embodiments and modifications which come within the scope of the appended claims.

I claim as my invention:

1. A single-phase alternating-current motor having a main primary winding and an auxiliary primary winding adapted to be connected in parallel to a supply line, a protective device including current-carrying thermally responsive means for actuating a contact and heating means for heating the thermally responsive means, means for connecting said contact and thermally responsive means in series with the line, and means for connecting said heating means to be energized by the current of the main primary winding and by a predetermined fractional part of the current of the auxiliary primary winding.

2. A single-phase alternating-current motor having a main primary winding and an auxiliary primary winding adapted to be connected in parallel to a supply line, a protective device including current-carrying thermally responsive means for actuating a contact and heating means for heating the thermally responsive means, means for connecting said contact and thermally responsive means in series with the line, and means for connecting said heating means to be energized by the current of the main primary winding and by substantially one-half of the total current of the auxiliary winding.

3. A single-phase alternating-current motor having a main primary winding and an auxiliary primary winding adapted to be connected in parallel to a supply line, said auxiliary primary winding comprising two similar, parallel-connected sections, a protective device including current-carrying thermally responsive means for actuating a contact and heating means for heating the thermally responsive means, means for connecting said contact and thermally responsive means in series with the line, and means for connecting said heating means to be energized by the current of the main primary winding and by the current of one section of the auxiliary primary winding.

4. A single-phase alternating-current motor having a main primary winding and an auxiliary primary winding adapted to be connected in parallel to a supply line, a protective device including a bimetallic element adapted to actuate a contact and an electrical heating element for heating the bimetallic element, means for connecting said bimetallic element and contact in series with the line, and means for connecting said heating element to carry the current of the main primary winding and a predetermined fractional part of the current of the auxiliary primary winding.

5. A single-phase alternating-current motor having a main primary winding and an auxiliary primary winding adapted to be connected in parallel to a supply line, a protective device including a bimetallic element adapted to actuate a contact and an electrical heating element for heating the bimetallic element, means for connecting said bimetallic element and contact in series with the line, and means for connecting said heating element to carry the current of the main primary winding and substantially one-half of the current of the auxiliary primary winding.

6. A single-phase alternating-current motor having a main primary winding and an auxiliary primary winding adapted to be connected in parallel to a supply line, said auxiliary winding comprising two similar, parallel-connected sections, a protective device including a bimetallic element adapted to actuate a contact and an electrical heating element for heating the bimetallic element, means for connecting said bimetallic element and contact in series with the line, and means for connecting said heating element to carry the current of the main primary winding and the current of one section of the auxiliary primary winding.

7. A single-phase alternating current motor having a main primary winding and an auxiliary primary winding adapted to be connected in parallel to a supply line, said auxiliary winding comprising two similar, parallel-connected sections, a protective device including a bimetallic element adapted to actuate a contact and an electrical heating element for heating the bimetallic element, means for connecting said bimetallic element and contact in series with the line, and means for connecting said heating element in series with the main primary winding and with one section of the auxiliary primary winding.

8. A single-phase alternating-current motor having a main primary winding and an auxiliary primary winding adapted to be connected in parallel to a supply line, said main primary winding comprising two similar sections connectible either in series or parallel for operation on different line voltages, and said auxiliary primary winding comprising two similar, parallel-connected sections, a protective device including current-carrying thermally responsive means for actuating a contact and heating means for heating the thermally responsive means, means for connecting said contact and thermally responsive means in series with the line, and means for connecting said heating means to be energized by the current of at least one section of the main primary winding in either connection of said winding and by the current of one section of the auxiliary primary winding.

9. A single-phase alternating-current motor having a main primary winding and an auxiliary primary winding adapted to be connected in parallel to a supply line, said main primary winding comprising two similar sections connectible either in series or parallel for operation on different line voltages, and said auxiliary primary winding comprising two similar, parallel-connected sections, a protective device including a bimetallic element adapted to actuate a contact and an electrical heating element for heating the bimetallic element, means for connecting said bimetallic element and contact in series with the line, and means for connecting said heating element in series with one section of the main primary winding in either connection of said winding and in series with one section of the auxiliary primary winding.

THOMAS CHARLTON.

REFERENCES CITED

The following references are of record in the file of this patent:

UNITED STATES PATENTS

| Number | Name | Date |
| --- | --- | --- |
| 2,259,972 | Ellis | Oct. 21, 1941 |
| 2,279,214 | Veinott | Apr. 7, 1942 |
| 2,338,515 | Johns | Jan. 4, 1944 |